(12) United States Patent
Holt et al.

(10) Patent No.: US 8,091,779 B2
(45) Date of Patent: *Jan. 10, 2012

(54) TRANSACTION PRODUCT WITH REMOVABLE COSMETIC ARTICLE

(75) Inventors: Brian R. Holt, Minneapolis, MN (US); Charlotte Ariss, Minneapolis, MN (US); Daniel A. Weston, Cottage Grove, MN (US); Allison G. Bender, St. Louis Park, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 751 days.

This patent is subject to a terminal disclaimer.

(21) Appl. No.: 12/139,199

(22) Filed: Jun. 13, 2008

(65) Prior Publication Data
US 2009/0308920 A1 Dec. 17, 2009

(51) Int. Cl.
*G06K 5/00* (2006.01)
*G06Q 40/00* (2006.01)

(52) U.S. Cl. ........................................ 235/380; 235/379

(58) Field of Classification Search ................. 235/379, 235/380, 492, 493; 206/470, 471, 771, 462, 206/461; 705/64; 713/165; 428/40.1; 40/638; 283/81; 340/10.1
See application file for complete search history.

(56) References Cited

U.S. PATENT DOCUMENTS

| | | | | |
|---|---|---|---|---|
| 2,993,587 | A | * | 7/1961 | Stone et al. .................. 206/471 |
| 3,307,281 | A | | 3/1967 | Mateo |
| 3,463,309 | A | * | 8/1969 | Szostek .......................... 206/470 |
| 3,762,545 | A | * | 10/1973 | Warner et al. ................. 206/771 |
| 4,408,693 | A | * | 10/1983 | Brewaeys et al. ............. 206/461 |
| 4,739,778 | A | | 4/1988 | Christie |
| 4,824,143 | A | | 4/1989 | Grainger |
| 4,832,301 | A | * | 5/1989 | Hiramoto et al. ............. 248/691 |
| 4,876,136 | A | | 10/1989 | Chang et al. |
| 4,890,872 | A | | 1/1990 | Parrotta et al. |
| 4,923,063 | A | | 5/1990 | Tararuj |

(Continued)

FOREIGN PATENT DOCUMENTS
WO 88/07825 10/1988

OTHER PUBLICATIONS

"Stored-Value Card With Chemical Luminescence", U.S. Appl. No. 11/510,264, filed Aug. 25, 2006.

(Continued)

*Primary Examiner* — Thien Mai
(74) *Attorney, Agent, or Firm* — Griffiths & Seaton PLLC

(57) ABSTRACT

A transaction product has an account identifier and includes one or more cosmetic articles. The cosmetic article may be held in place by a tray such that both are readily removable from the housing. The transaction product and its various components, taken together, have a visual appeal accentuated by a sense of depth provided by employing indicia on different visual planes and by using transparent and/or translucent panels. The indicia may be evocative of the nature of cosmetic article, including graphics that depict the color, texture, or other physical properties of the particular cosmetic article enclosed within the transaction product. The account identifier is associated with the housing and links the transaction product to an account or record having a value configured to be used toward one or more of a purchase and a use of goods or services.

12 Claims, 8 Drawing Sheets

U.S. PATENT DOCUMENTS

| | | | |
|---|---|---|---|
| 4,991,878 A * | 2/1991 | Cowan et al. | 283/81 |
| 4,998,621 A | 3/1991 | Meehan | |
| 5,037,139 A | 8/1991 | Schoenleber et al. | |
| 5,072,831 A | 12/1991 | Parrotta et al. | |
| 5,119,952 A | 6/1992 | Warriner, Jr. | |
| 5,183,159 A * | 2/1993 | Hojnacki et al. | 206/583 |
| 5,292,003 A * | 3/1994 | Baghdassarian | 206/575 |
| 5,328,137 A * | 7/1994 | Miller et al. | 248/220.21 |
| 5,405,000 A * | 4/1995 | Hagedon et al. | 206/216 |
| 5,407,076 A | 4/1995 | Sabet | |
| 5,520,202 A | 5/1996 | Arbree | |
| 5,647,941 A | 7/1997 | Gunderman et al. | |
| 5,782,346 A * | 7/1998 | Gray et al. | 206/228 |
| 5,918,608 A | 7/1999 | Renna | |
| 6,036,021 A * | 3/2000 | Moi | 206/570 |
| 6,047,820 A * | 4/2000 | Heinze, IIII | 206/232 |
| 6,053,321 A * | 4/2000 | Kayser | 206/470 |
| 6,216,866 B1 * | 4/2001 | Schoenberg | 206/320 |
| 6,349,829 B1 | 2/2002 | Matheis et al. | |
| 6,461,620 B2 | 10/2002 | Dobler | |
| 6,585,112 B2 | 7/2003 | Levin et al. | |
| 6,622,864 B1 * | 9/2003 | Debbs et al. | 206/438 |
| 6,688,467 B2 | 2/2004 | Krupka et al. | |
| 6,889,839 B1 * | 5/2005 | Rosten et al. | 206/583 |
| 6,945,397 B2 * | 9/2005 | Brattesani et al. | 206/362.2 |
| 6,957,737 B1 * | 10/2005 | Frederickson et al. | 206/449 |
| 7,163,152 B2 | 1/2007 | Osborn et al. | |
| 7,281,344 B2 * | 10/2007 | Knauf | 40/649 |
| D557,053 S | 12/2007 | Osborn et al. | |
| 7,316,357 B2 | 1/2008 | Lindahl et al. | |
| D572,588 S | 7/2008 | Osborn et al. | |
| 7,571,810 B2 * | 8/2009 | Tilton | 206/462 |
| 8,047,425 B2 * | 11/2011 | Holt et al. | 235/379 |
| 2002/0108875 A1 * | 8/2002 | Feinberg et al. | 206/364 |
| 2002/0125164 A1 | 9/2002 | Bassinson | |
| 2002/0143697 A1 | 10/2002 | Gotfried | |
| 2003/0004889 A1 * | 1/2003 | Fiala et al. | 705/64 |
| 2003/0070338 A1 * | 4/2003 | Roshkoff | 40/638 |
| 2003/0230501 A1 | 12/2003 | Smolev | |
| 2004/0028864 A1 * | 2/2004 | Nelson | 428/40.1 |
| 2004/0056479 A1 * | 3/2004 | Fox et al. | 283/101 |
| 2004/0139318 A1 * | 7/2004 | Fiala et al. | 713/165 |
| 2005/0000845 A1 | 1/2005 | Inoue | |
| 2005/0155618 A1 | 7/2005 | Lafferty | |
| 2006/0124749 A1 | 6/2006 | Osborn et al. | |
| 2006/0208062 A1 | 9/2006 | Osborn et al. | |
| 2006/0260969 A1 | 11/2006 | Peck et al. | |
| 2007/0175788 A1 * | 8/2007 | Holba et al. | 206/471 |
| 2007/0194128 A1 | 8/2007 | Coe et al. | |
| 2007/0241186 A1 | 10/2007 | Lindahl et al. | |
| 2007/0241198 A1 | 10/2007 | Halbur et al. | |
| 2008/0011319 A1 | 1/2008 | Ripoli | |
| 2009/0058609 A1 * | 3/2009 | Clayman | 340/10.1 |
| 2009/0140042 A1 | 6/2009 | Clegg | |

OTHER PUBLICATIONS

"Stored-Value Product With Housed Article", U.S. Appl. No. 11/697,271, filed Apr. 5, 2007.

"Transaction Product With Removable Articles", U.S. Appl. No. 11/843,844, filed Aug. 23, 2007.

"Transaction Product With Gelatinous Substance", U.S. Appl. No. 11/843,855, filed Aug. 23, 2007.

"Transaction Product With Storage Chamber", U.S. Appl. No. 11/965,467, filed Dec. 27, 2007.

"Transaction Product With Inflatable Article", U.S. Appl. No. 11/965,472, filed Dec. 27, 2007.

http://www.justicejustforgirls.com/store, available at least as early as Mar. 14, 2008, 2 pages.

http://www.justicejustforgirls.com/items/zoom/1721013.jpg, available at least as early as Mar. 14, 2008, 1 page.

Photographs of Sonia Kashuk compact with credit card and driver's license holder, available in Target stores more than one year prior to Jun. 23, 2008.

Wade, Will, "First Data Sees Sticker Device as Mobile-Pay Bridge," American Banker, Aug. 25, 2008, 2 pages.

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

* cited by examiner

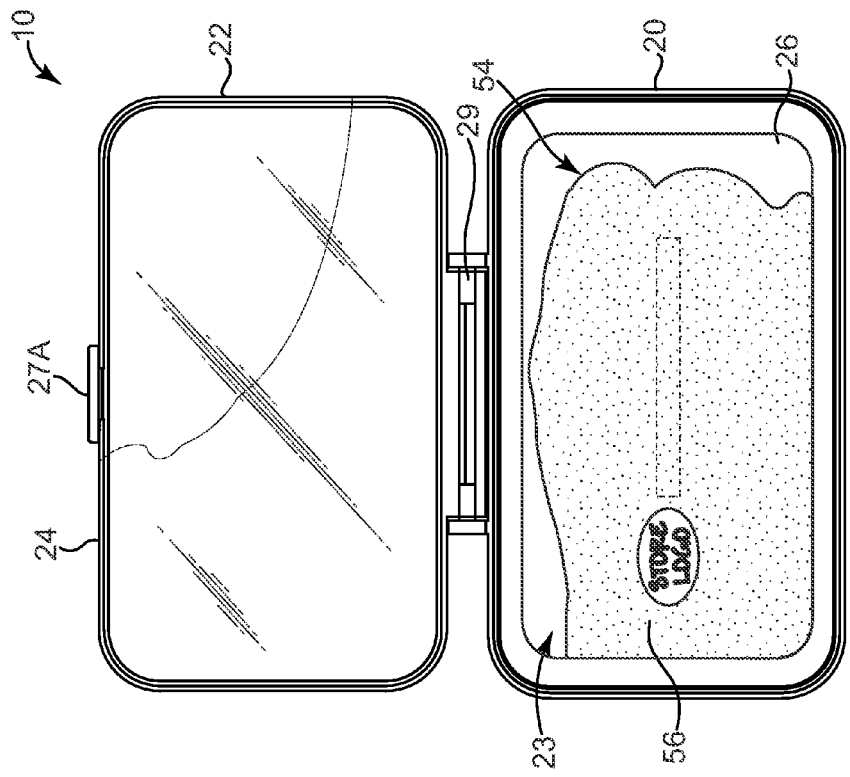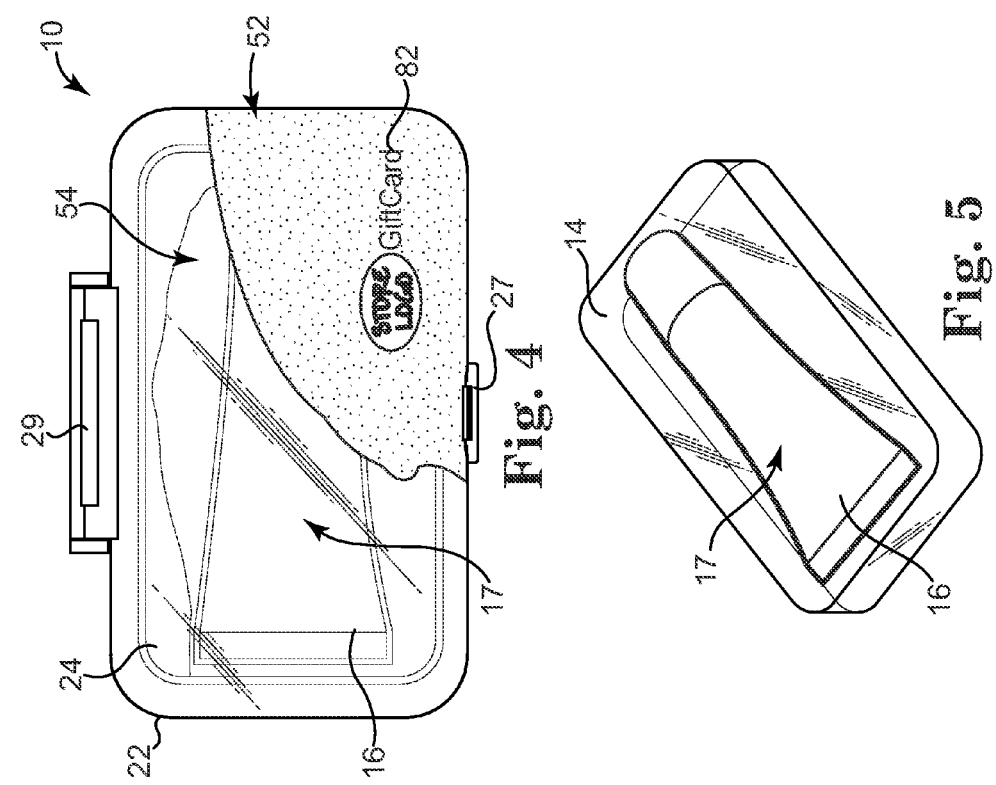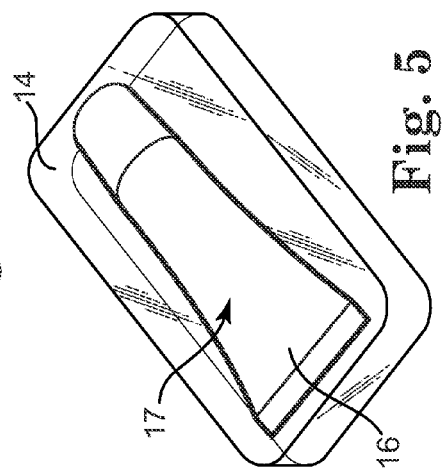

TRANSACTION PRODUCT WITH REMOVABLE COSMETIC ARTICLE

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY

One aspect of the present invention relates to a transaction product having an account identifier and including one or more cosmetic articles. The cosmetic article may be held in place by a tray such that both are readily removable from the housing. In one embodiment, the transaction product and its various components, taken together, have a visual appeal accentuated by a sense of depth provided by employing indicia on different visual planes and by using transparent and/or translucent panels. The indicia may be evocative of the nature of cosmetic article, including graphics that depict the color, texture, or other physical properties of the particular cosmetic article enclosed within the transaction product. The account identifier is associated with the housing and links the transaction product to an account or record having a value configured to be used toward one or more of a purchase and a use of goods or services. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 4 is a top view illustration of the transaction product of FIG. 1.

FIG. 5 is a perspective view illustration of a cosmetic article and tray, according to one embodiment of the present invention;

FIG. 6 is a top view illustration of the transaction product of FIG. 2;

DETAILED DESCRIPTION

Figure 1:
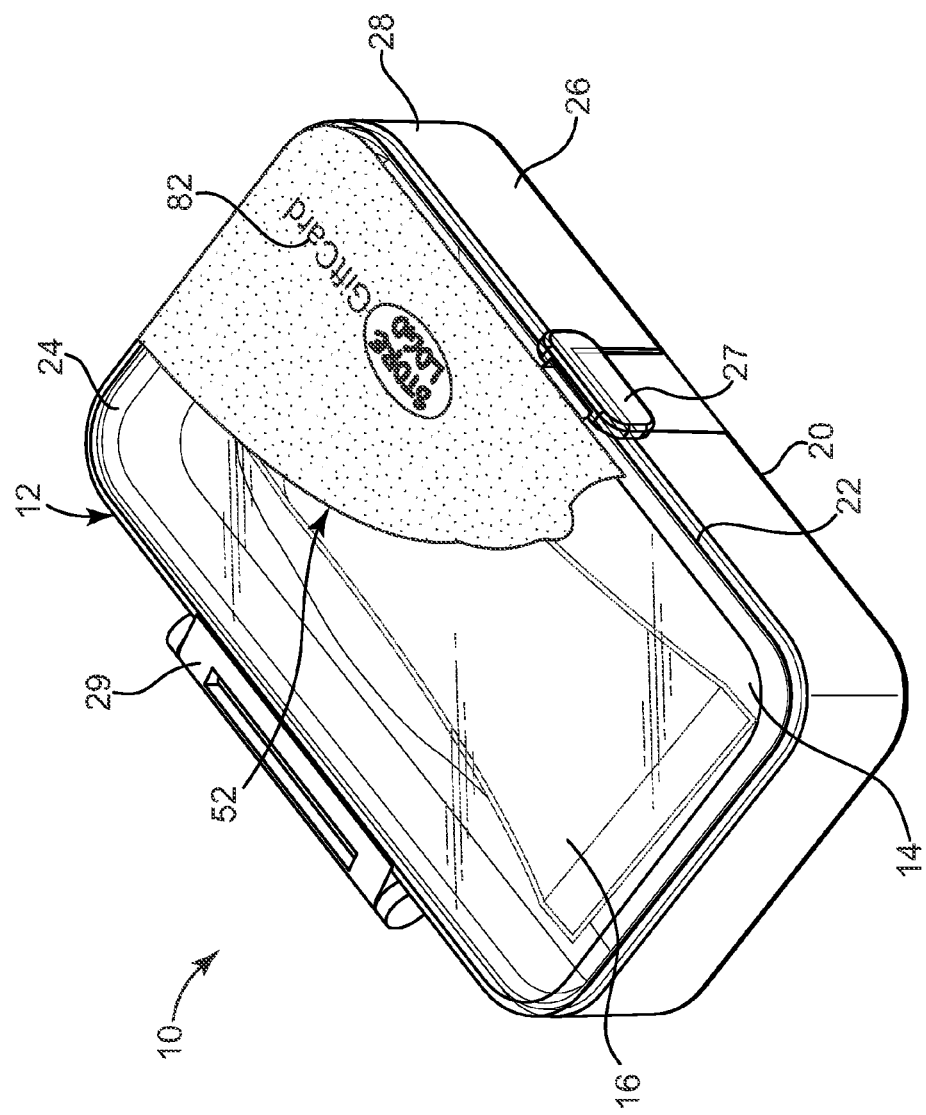
FIG. 1 is perspective view illustration of a closed transaction product, according to one embodiment of the present invention.

A stored-value card and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, provides the consumer and recipient with extra amusement and non-transactional functionality in addition to the ability to pay for goods and/or services with the transaction product.

In particular, the transaction product includes a housing having a cosmetic article, such as lip gloss tube or the like, or one or other beauty products enclosed within the transaction product and removeable therefrom. The cosmetic article may be held in place by virtue of an internal structure integrated into the housing, or may be secured using a removeable insert or tray that facilitates organized placement of the cosmetic article(s) into and/or organized removal of the cosmetic article(s) from the housing. The housing is configured for use toward the purchase or use of one or more of goods and/or services. During non-transactional use, the housing can be opened and the cosmetic article contained therein can be removed. In one embodiment, a tray is specifically sized and shaped to maintain the cosmetic article in a neat and aesthetically pleasing manner. In one embodiment, removing the tray from the housing also removes the cosmetic article from the housing. In one embodiment, one or more of the housing and tray are transparent or translucent such that the cosmetic article itself as well as indicia related to the nature of the cosmetic article are visible during display to the user. In a particular embodiment, the indicia includes graphics representing the color, texture, and/or other physical characteristics of the cosmetic article.

In one example, the housing is formed of two pieces that are selectively coupled to one another, e.g., via a hinge structure working in conjunction with a latch structure. When the cosmetic article and/or tray are placed within the housing, the two pieces of the housing can be removeably coupled to one another to enclose the tray and cosmetic article within the housing. Conversely, the housing can be opened to allow the cosmetic article to be removed.

Turning to the figures, FIGS. 1-8 illustrate a transaction product 10 (e.g., a financial transaction product and/or stored-value card) according to one embodiment of the present invention. Transaction product 10 includes a casing or housing 12 enclosing one or more cosmetic articles 16, wherein a tray 14 may be used to secure a cosmetic article 16 within housing 12. In one embodiment, housing 12 includes a first housing member 20 and a second housing member 22 configured to be selectively coupled with first housing member 20 to maintain tray 14 and cosmetic article(s) 16 therebetween. Housing 12, by virtue of housing members 20 and 22, has an open state (e.g., FIG. 2) and a closed state (e.g., FIG. 1).

Housing 12 includes a first panel 24 and a second panel 26 spaced from and extending substantially parallel with one another. In one embodiment, first and second panels 24 and 26 are each substantially planar members and are similarly sized and shaped. In one example, each of first and second panels 24 and 26 is substantially rectangular. A side wall 28 extends from panel 26 along its entire perimeter perpendicular to panel 26. First housing member 20 and second housing member 22 may be removeably coupled to selectively open and close housing 12.

In the illustrated embodiment, a hinge structure 29 rotatably couples housing member 20 and housing member 22, and a latch structure 27 is used to latch the two housing members 20 and 22 together in a closed state. Hinge structure 29 may include injection-molded hinge pins integral to either first housing member 22 or second housing member 20 that interface with an axial, generally cylindrical mating member (not shown).

For example, latch structure 27 may include two corresponding structures 27A and 27B integrated into respective housing members 22 and 20 that form an interference fit with respect to each other (or are otherwise removeably coupled) when housing 12 is in a closed state. Mating portions of first housing member 22 and second housing member 20 may include a flange (not shown) to further effect coupling of their respective surfaces, as is known in the art. First housing member 22 and second housing member 20 therefore define a chamber or cavity 23 therebetween, in which cosmetic article 16 and/or tray 12 are removeably placed.

In one embodiment, first and second housing members 20 and 22 are each formed by injection molding plastic (e.g. polycarbonate, polystyrene, polyvinyl chloride (PVC), acrylonitrile butadiene styrene (ABS), acrylonitrile styrene, polyethylene terephthalate (PET), teslin, polylactide (PLA) and acrylic) or other suitable material to define the various attributes of first and second housing members 20 and 22. In one embodiment, at least one of first and second housing members 20 and 22 is substantially translucent or substantially transparent.

In one embodiment, transaction product 10 and its various components, taken together, have visual appeal that is accentuated by a sense of depth provided by employing decorative indicia on different visual planes. That is, referring to FIG. 4, one embodiment includes indicia 54 provided on panel 26 (the "bottom" of housing 12), as well as indicia 52 provided on panel 24 (the "top" or "lid" of the housing). Note that these indicia may be provided on any suitable surface (inner or outer) of the respective panels, or may be incorporated into the panels themselves. Indicia 82 related to a store logo or the like may also be included on panel 24 or panel 26.

In one embodiment, tray 14 is at least partially transparent or translucent, as is panel 24. Thus, cosmetic article 16 appears between two levels of indicia 52 and 54. As cosmetic article 16 may have decorative features, the transaction product 10 as a whole has an aesthetic appeal not typical in such products.

In one embodiment, indicia 52 and 54 are evocative of the nature of cosmetic article 16, and may include graphics that depict the color, texture, or other physical properties of the particular cosmetic article 16 enclosed within housing 12. For example, in one embodiment, wherein cosmetic article 16 includes a lip gloss material, indicia 52 and 54 may include color graphics that depict the way that lip gloss material would appear in various contexts.

In one embodiment, indicia 52 and 54 depict how the lip gloss material would appear if it were spread thickly over a flat surface. This depiction may correspond to its actual in situ appearance, or may be modified and/or magnified to highlight its color, iridescence, texture, or the like. Indicia 52 and 54 alternatively may be stylized, and artificial. In another embodiment, indicia 52 and 54 depict the use of cosmetic article 16 for its intended purpose on the actual face or other anatomical surface of an individual. In one embodiment, indicia 56 (FIG. 6) on panel 26 include branding or other information related to cosmetic article 16, and is hidden by cosmetic article 16 until it is removed and revealed to the consumer.

Figure 10:
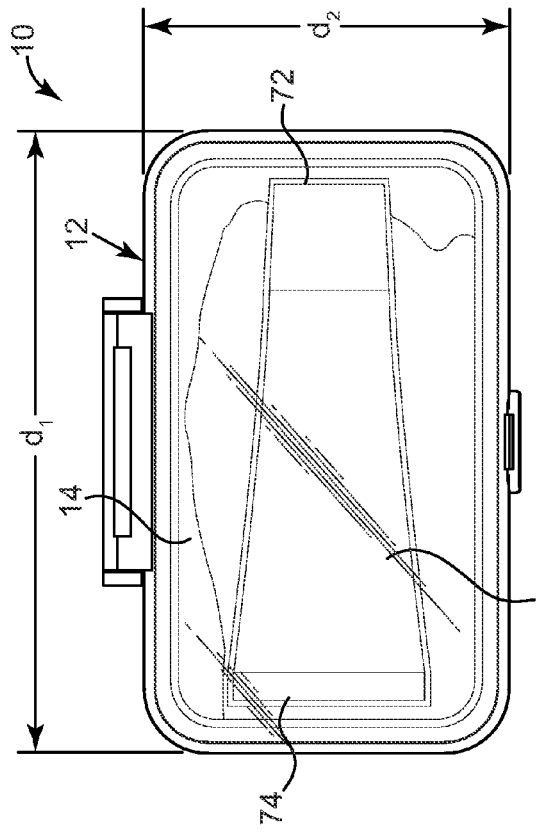
FIG. 10 is a top view illustration of the cosmetic article and tray of FIG. 9.
Figure 11:
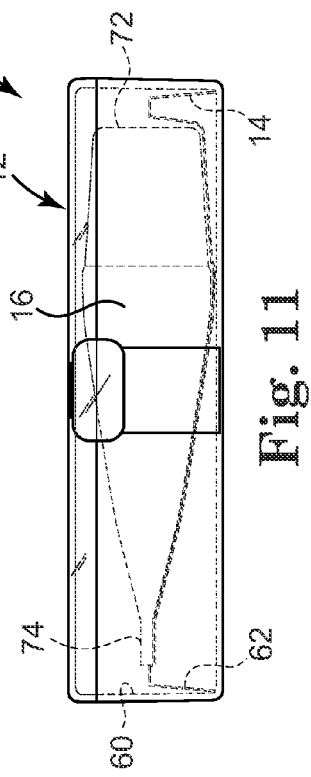
FIG. 11 is a side view illustration of the cosmetic article and tray of FIG. 9.
Figure 9:
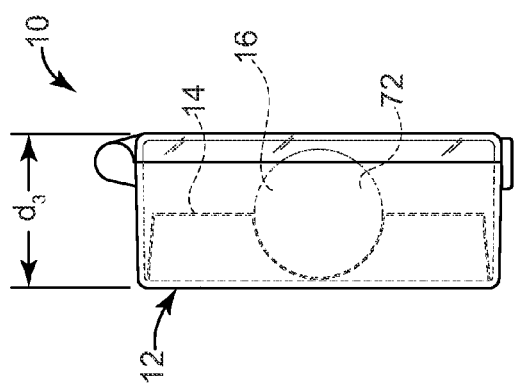
FIG. 9 is a front view of a cosmetic article and tray, according to one embodiment of the present invention.

Housing 12 may have any suitable size and shape, but in one embodiment has a length and width similar to that of a common credit card. Referring to FIGS. 9-11, for example, in one embodiment housing 12 has a length dimension, $d_1$, of about 3.63 inches, a width dimension, $d_2$, of about 2.42 inches, and a thickness dimension, $d_3$, of about 0.9 inches.

Figure 3:
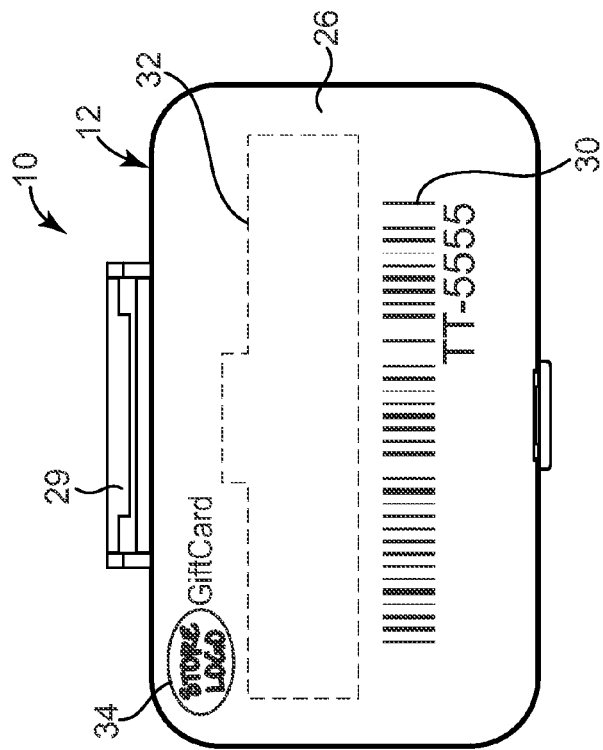
FIG. 3 is a rear view illustration of the transaction product of FIG. 1.
Figure 2:
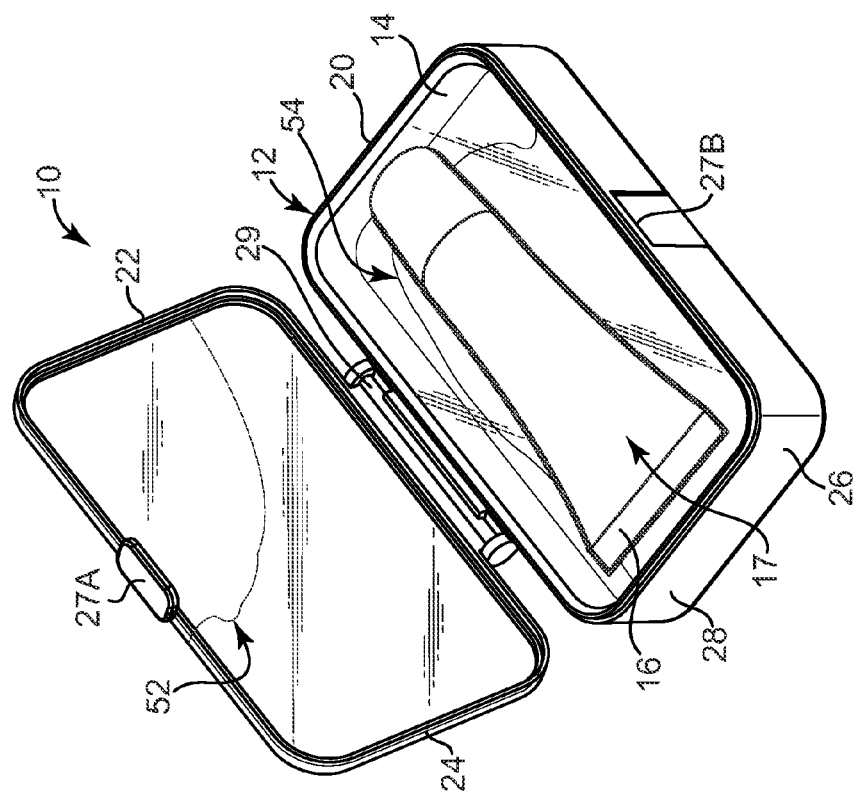
FIG. 2 is a perspective view illustration of an open transaction product, according to one embodiment of the present invention.
Figure 8:
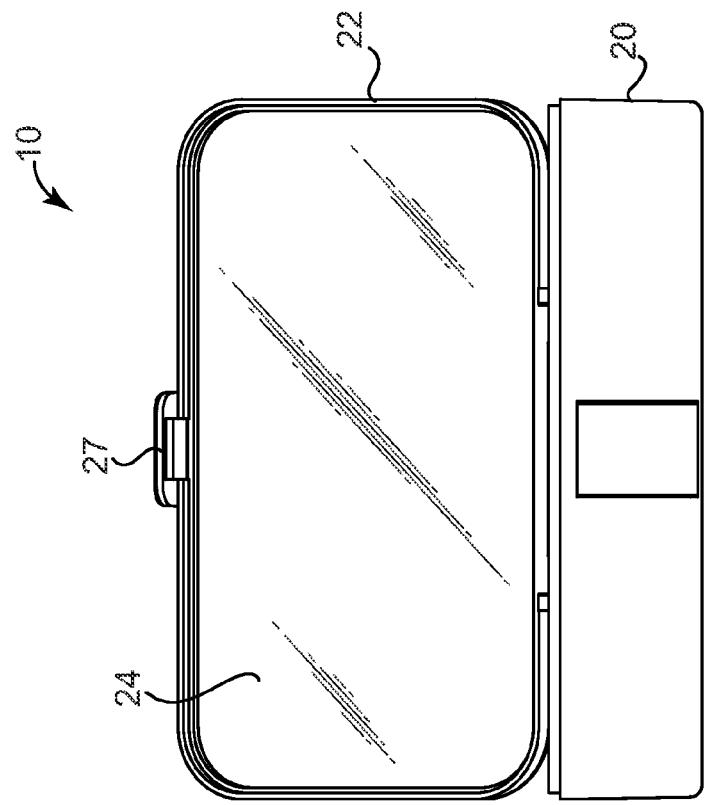
FIG. 8 is a front view illustration of the transaction produce of FIG. 2.
Figure 7:
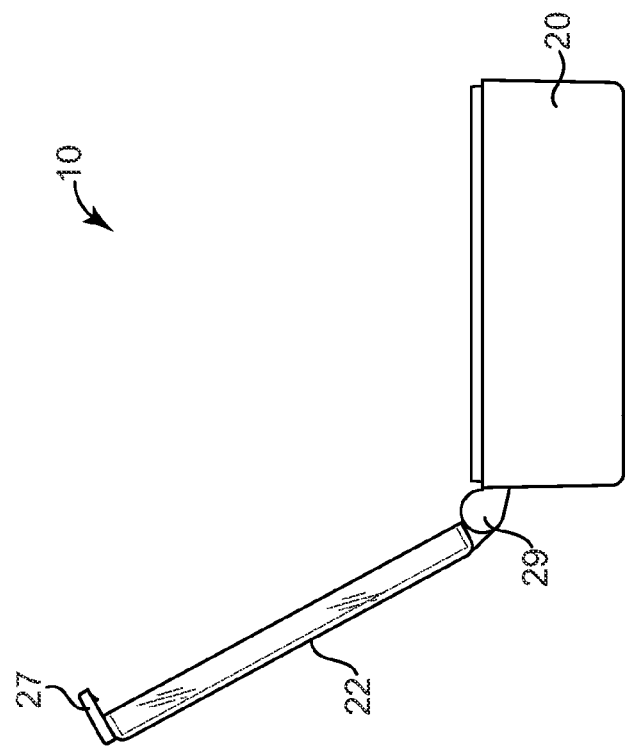
FIG. 7 is a side view illustration of the transaction product of FIG. 2.

Referring to the rear view illustration of FIG. 3, storedvalue card 10, for example, a surface of second panel 26 of housing 12, includes at least one account activation area or account identifier 30, such as a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 30 is machine readable, account identifier 30 is also readable by a bearer of transaction product or stored-value card 10 such that transaction product 10 can be used when a machine configured to read transaction product 10 is not present (e.g., when using transaction product 10 to make a purchase on a web site). For example, account identifier 30 may include a number or letter string identifying the associated account or record and/or a password (not illustrated) associated therewith. In one embodiment, account identifier 30 is printed on or otherwise applied to panel 26 of substrate 12; however, the account identifier 30 could additionally or alternatively be printed or applied to any other suitable surface.

Account identifier 30 indicates and therefore links transaction product 10 to a financial or other stored-value account or record. The account or record indicates a value or balance (e.g., monetary value, points, minutes, or other balance) associated with transaction product 10 and optionally is maintained on a database, other electronic or manual record-keeping system, or, in the case of "smart" cards for example, on a chip or other electronic device on/in transaction product 10 itself. Accordingly, by scanning account identifier 30, the account or record linked to transaction product 10 is identified and can subsequently be activated, have amounts debited therefrom, and/or have amounts credited thereto. Account identifier 30 is one example of means for linking transaction product 10 with an account or record.

In one embodiment, redemption indicia 32 are included on transaction product 10, such as on panel 26 of substrate 12. Redemption indicia 32 indicate that transaction product 10 is redeemable for the purchase of goods and/or services and that, upon use, a value of the purchased goods and/or services will be deducted from the account or record linked to transaction product 10. In one embodiment, redemption indicia 32 include phrases such as "<NAME OF STORE> GiftCard" and "This GiftCard is redeemable for merchandise or services at any of our stores or at our web site," provides help or phone line information in the case of a lost, stolen, or damaged transaction product, etc.

In one embodiment, transaction product 10 includes printed indicia 34. Printed indicia 34 include any suitable graphics, text, or combinations thereof. In one example, printed indicia 34 include one or more brand identifiers and/or other graphical items, described in further detail below. Brand identifiers include one or more of a logo, text, trademark, etc. that associate transaction product 10 with at least one of a product, a brand, a store, etc. Other indicia or additional features may also be included on transaction product 10 as will be apparent to those of skill in the art upon reading this application. Any one or more of printed indicia 34 may not be included on transaction product 10.

Referring to FIGS. 9-11, tray 14 is formed with external dimensions allowing tray 14 to be readily inserted into and removed from second housing member 20. In one embodiment, where housing 12 is substantially rectangular, tray 14 is substantially rectangular. In one embodiment, tray 14 is independently configured to support the one or more cosmetic articles 16 whether or not tray 14 is positioned within or outside of housing 12. In one embodiment, tray 14 is at least partially transparent and/or translucent such that panel 26 can be viewed through tray 14 when tray 14 is inserted within second housing member 20.

In one embodiment, tray 14 has a cross-sectional shape specifically configured to receive one of cosmetic article(s) 16. For example, in one embodiment, where the one or more cosmetic articles 16 is a tube of lip gloss or lipstick, tray 14 has a lateral cross-section sized and shaped to conform to at least a portion of the lateral cross-sectional shape of cosmetic article 16 such that it tightly but removeably fits within tray 14.

Tray 14 may be vacuum formed to precisely conform to the shape of cosmetic article 16. In one embodiment, tray 14 is formed by injection molding plastic (e.g. polycarbonate, polystyrene, polyvinyl chloride (PVC), acrylonitrile butadiene styrene (ABS), acrylonitrile styrene, polyethylene terephthalate (PET), teslin, polyactide (PLA) and acrylic) or other suitable material to define the various attributes of tray 14. In one embodiment, tray 14 is substantially translucent or substantially transparent and/or otherwise coordinates with first housing member 20 and second housing member 22. In one example, tray 24 deforms elastically such that it can be removed and inserted easily within second housing member 20. As shown in FIG. 11, a side 62 of tray 14 may be beveled such that it presses against and is held in place by an inner surface 60 of housing 12, effectively forming a compression fit between the two components.

In one embodiment, the one or more cosmetic articles 16 define a first end 72 and a second end 74 opposite first end 72. In one embodiment, where each cosmetic article 16 is a tube structure first end 72 is substantially cylindrical (as in a screw top) while second end 74 is substantially flattened.

During assembly, tray 14 receives cosmetic article(s) 16. In one example, one of cosmetic article(s) 16 is placed within an indentation within tray 14, such that each cosmetic article 16 is tightly retained in place at least partially within tray 14. Once cosmetic article(s) 16 are placed in tray 14, tray 14 is placed within cavity 23 of second housing member 20. First housing member 22 is then coupled to second housing member 20, e.g., via hinge structure 29 and latch structure 27. Alternatively, first housing member 22 may be hingedly coupled to second housing member 20, and placed in an open state, prior to inserting tray 14 and cosmetic article(s) 16.

In the illustrated embodiment, the resulting housing 12 is a substantially rectilinear volume. However, housing 12 may have a variety of 3D shapes, such as cylindrical, parallelepiped, prismatic, and the like.

During use of transaction product 10 for cosmetic purposes, first and second housing members 20 and 22 are separated and tray 14 and the one or more cosmetic articles 16 are removed from within first and second housing members 20 and 22. As described above, in one embodiment, upon removal of tray 14 from housing 12, each cosmetic article 16 may be separately and selectively stored and removable from tray 14.

Figure 14:
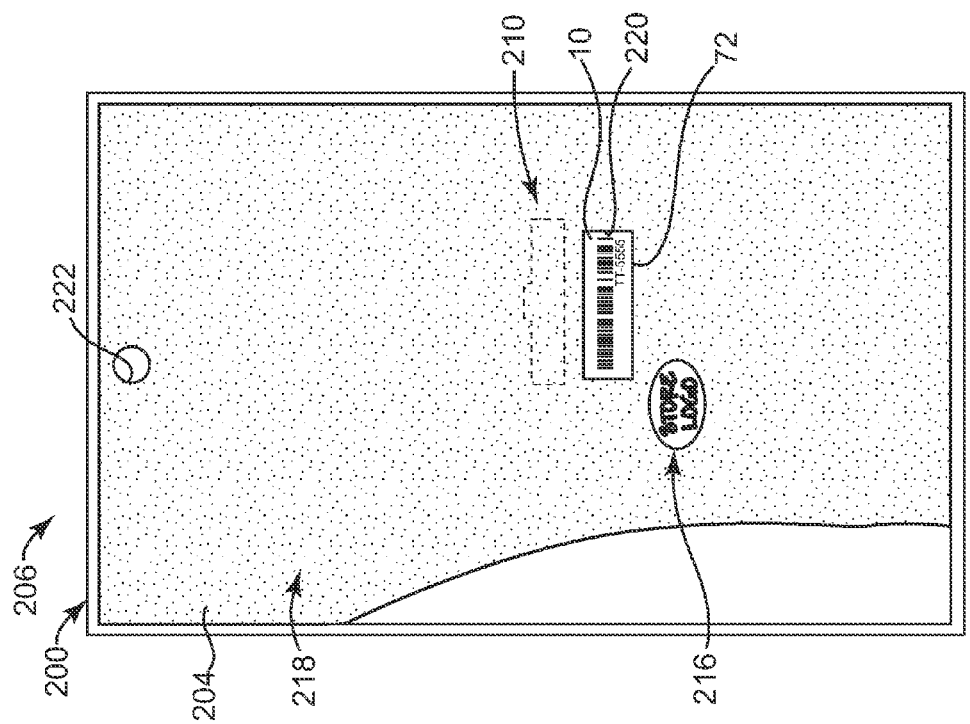
FIG. 14 illustrates one side of a backer, according to one embodiment of the present invention.
Figure 15:
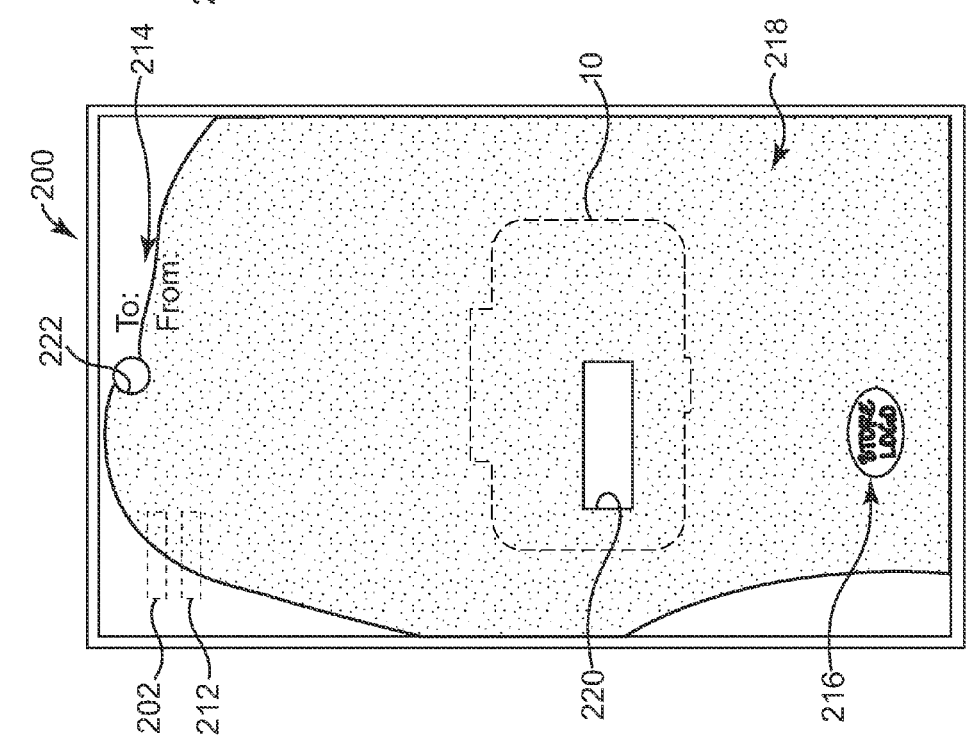
FIG. 15 illustrates the opposite side of the backer shown in FIG. 14 with a transaction product, according to one embodiment of the present invention.

FIGS. 14 and 15 illustrate a carrier or backer 200 supporting transaction product 10 (FIGS. 1-7). Backer 200 comprises a single layer or multiple layers of paper or plastic material, for example, generally in the form of a relatively stiff but bendable/flexible card. Use of other materials to form backer 200 is also contemplated. Backer 200 defines a first or front surface 202 (FIG. 14) and a second or rear surface 204 (FIG. 15).

Transaction product 10, which is generally represented in broken lines in FIG. 14 for illustrative purposes (e.g., to allow for full viewing of front surface 202), is readily releasably attached to backer 200, for example, by adhesive, blister packaging, overlying skinning material, or the like, such that transaction product 10 and backer 200 collectively define a transaction product assembly 206.

In one embodiment, backer 200 displays indicia, graphics or text information including store logo(s), store name(s), slogans, advertising, instructions, directions, brand indicia, promotional information, holiday indicia, seasonal indicia, media format identifiers, characters, and/or other information. The various indicia may be included on one or more of front and rear surfaces 202 and 204. In one example, the indicia include one or more of redemption indicia 210, instructional indicia 212, message field indicia 214, brand indicia 216, decorative indicia 218, etc.

Redemption indicia 210 indicate that transaction product 10 is redeemable for the purchase of goods and/or services and that upon use, a value of the purchased goods and/or services will be deducted from the account or record linked to transaction product 10. In one embodiment, redemption indicia 210 include phrases such as "<NAME OF STORE> Gift-Card" and "This GiftCard is redeemable for merchandise or services at any of our stores or at our website," and/or provides help or phone line information in case of a lost, stolen or damaged transaction product 10, etc. Instructional indicia 212 include any indications generally referring to how transaction product 10 can be used for entertainment or functional purposes other than value redemption.

Message field indicia 214, for example, include "to," "from," and "amount" fields configured to be written to by the bearer of transaction product assembly 206 prior to presenting transaction product assembly 206 to a recipient. As such, message field indicia 214 facilitate the consumer in preparing transaction product assembly 206 for gifting to a recipient. Brand indicia 216 identify a store, brand, department, etc. and/or services associated with transaction product 10.

Any decorative indicia 218 may also be included on backer 200. Decorative indicia 218 may include, for example, graphics that illustrate the appearance of cosmetic article 16, either on an arbitrary surface, or on the appropriate anatomical location of the cosmetic article 16. For example, when cosmetic article 16 is a lip gloss or lip stick, decorative indicia 218 may include images of human lips (either realistic or stylized) with the appropriate cosmetic color or gloss applied. Any of indicia 210, 212, 214, 216, 218, or other indicia optionally may appear anywhere on backer 200 or transaction product 10. Additional information besides that specifically described and illustrated herein may also be included.

In one embodiment, backer 200 defines a window or opening 220 for displaying account identifier 30 of transaction product 10 as illustrated in FIG. 15. As previously described, account identifier 30 is adapted for accessing an account or record associated with transaction product 10 for activating, loading or debiting value from the account or record. Accordingly, in one embodiment, opening 220 allows access to account identifier 30 to activate and/or load transaction product 10 without removing transaction product 10 from backer 200.

In one embodiment, backer 200 defines a hanging aperture 222 configured to receive a support arm or hook, such that transaction product assembly 206 can be hung from a rail or rack within the retail setting or elsewhere to facilitate display of transaction product assembly 206. According to one embodiment, FIG. 15 illustrates surfaces of backer 200 that will be supported on a rack or other fixture while FIG. 14 illustrates surfaces of backer 200 that will be visible to a consumer of a retail store who is considering the purchase of transaction product assembly 206. Other backers, such as foldable backers (not shown), can be used with various sizes and shapes of transaction products 10.

Figure 12:
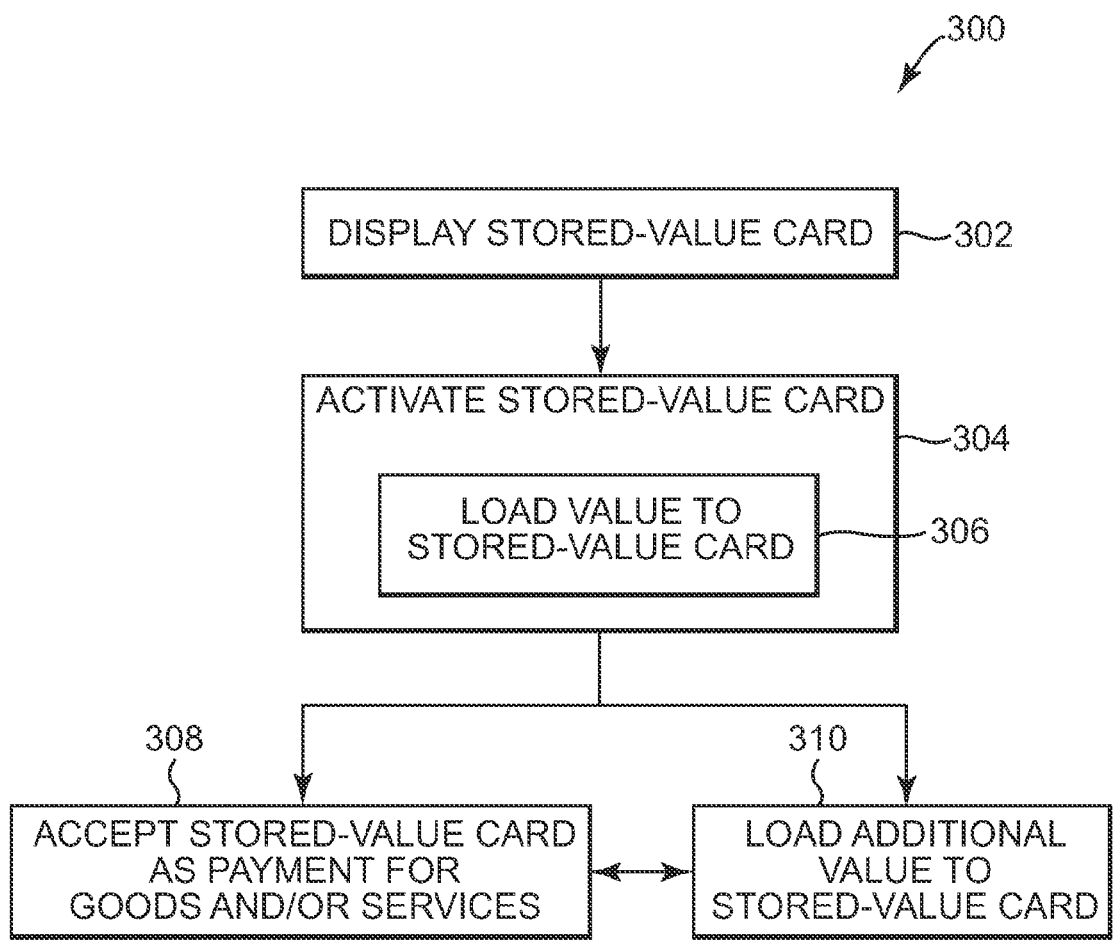
FIG. 12 is a flow chart illustrating a method of providing a transaction product, according to one embodiment of the present invention.

FIG. 12 is a flow chart illustrating one embodiment of a method 300 of encouraging purchase and facilitating use of transaction product 10 by consumers and/or recipients. At 302, transaction product 10 is placed on or hung from a rack, shelf, or other similar device to display transaction product 10 for sale to potential consumers. In one embodiment, a depiction of transaction product 10 is placed on a web site for viewing and purchase by potential consumers.

At 304, a consumer who has decided to purchase transaction product 10 presents transaction product 10 on backer 100 to a retail store employee, retail store kiosk, remote terminal, or other person or device to scan account identifier 30 to access an account or record linked to account identifier 30. In particular, account identifier 30 is scanned or otherwise accessed, for example through opening 320 of backer 100 to activate transaction product 10. Upon accessing the account or record, then, at 306, value is added to the account or record in the form of monetary value, points, minutes, etc. Thus, transaction product 10 is activated and loaded.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 302, then, at 304, transaction product 10 may be activated in any suitable method and may not require the physical scanning of account identifier 30 to be activated or to otherwise access the associated account or record such as at 306.

In one example, at 308, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 30) is applied toward the purchase of goods and/or services. At 310, additional value is optionally loaded on transaction product 10 at a point-of-sale terminal, kiosk, or other area of the retail store or related setting. Upon accepting transaction product 10 as payment at 308, the retail store or related setting can subsequently perform either operation 308 or operation 310 as requested by a current bearer of transaction product 10. Similarly, upon loading additional value on transaction product 10 at 310, the retail store or related setting can subsequently perform either operation 310 again or operation 308. In one example, the ability to accept transaction product 10 as payment for goods and/or services is limited by whether the account or record associated with transaction product 10 has any value stored or recorded therein at the time of attempted redemption.

Figure 13:
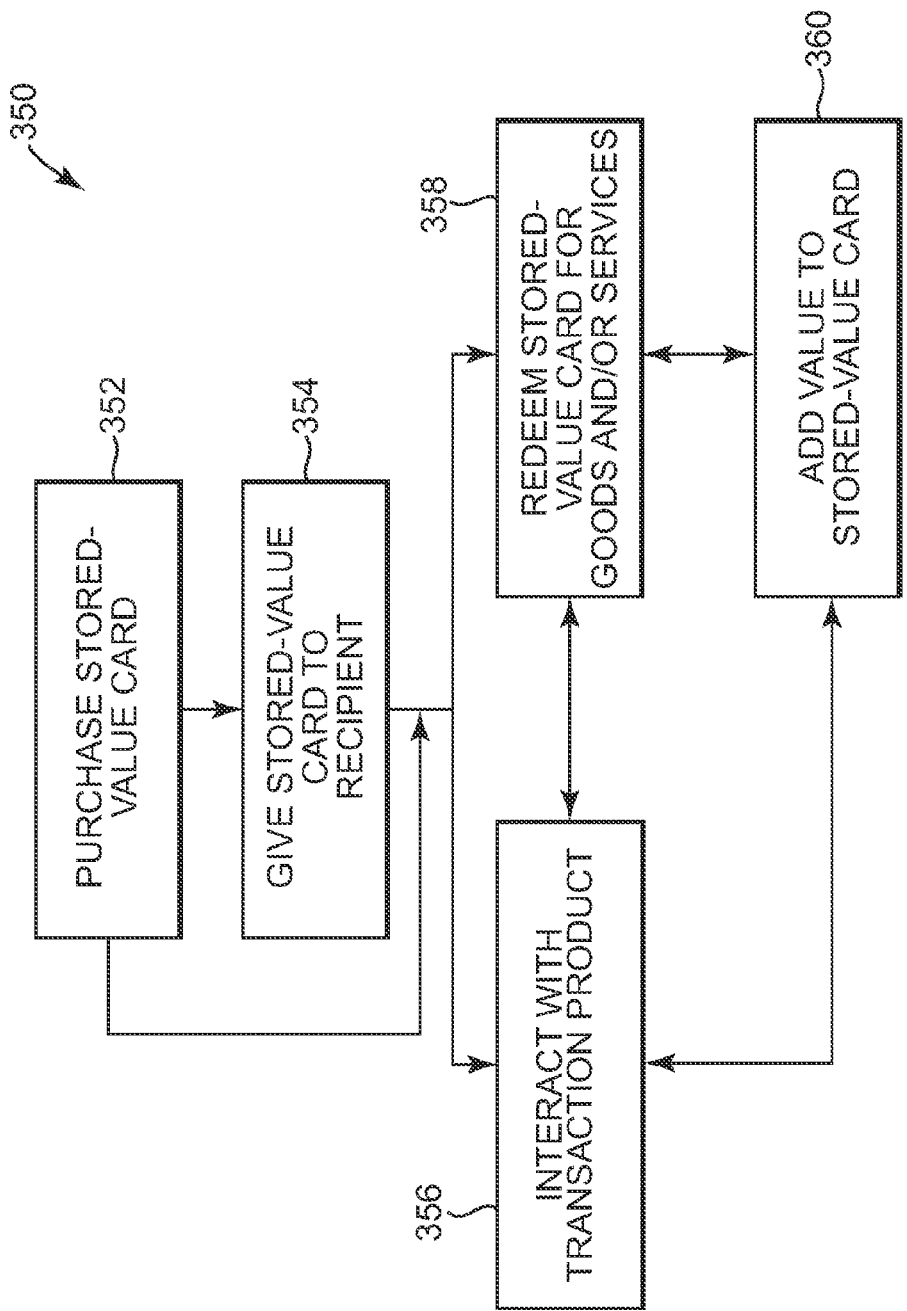
FIG. 13 is a flow chart illustrating a method of using a transaction product, according to one embodiment of the present invention.

FIG. 13 is a flow chart illustrating one embodiment of a method 350 of using transaction product 10 (e.g., FIGS. 1-7). At 352, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206 (FIG. 15) along with backer 100. Upon purchasing transaction product 10, a retail store employee, a retail store kiosk, or other person or device scans account identifier 30 (FIGS. 3 and 15) through opening 114 of backer 100 or otherwise reads or accesses account identifier 30. Upon accessing account identifier 30, the account or record linked to account identifier 30 is accessed and activated to load value onto transaction product 10 (i.e., load value to the account or record associated with transaction product 10). In one embodiment, such as where transaction product 10 is purchased at 352 via a web site, actual scanning or other mechanical detection of account identifier 30 may be eliminated.

At 354, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 354.

At 356, the consumer, recipient, or other current bearer of stored value card 10 interacts with the card for the purposes of amusement, e.g., by removing the cosmetic article 16 and utilizing it for its intended purpose.

At 358, the consumer or recipient redeems transaction product 10 for goods and/or services from the retail store or web site. At 360, the consumer or recipient of transaction product 10 optionally adds value to transaction product 10, more particularly, to the account or record associated with account identifier 30 included therewith, at the retail store or over the Internet (i.e., via the web site). The consumer or recipient of transaction product 10 subsequently can perform either of operations 356, 358, or 360 as desired. In one embodiment, the ability of the consumer or recipient to repeat redeeming transaction product 10 at 358 is limited by whether the account or record linked with transaction product 10 has any remaining value stored or recorded therein at the time of attempted redemption.

Although described above as occurring at a single retail store or web site, in one embodiment, purchasing transaction product 10 at 352, redeeming transaction product 10 at 358, and adding value to transaction product 10 at 360, can each be performed at any one of a number of stores adapted to accept transaction product 10 or over the Internet. In one example, a number of stores are each part of a chain or are similarly branded stores. In one example, a number of stores include at least one web site and/or at least one conventional brick and mortar store.

Stored-value cards or transaction cards come in many forms, according to embodiments of the invention. The gift card, like other stored-value cards, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the transaction product declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards, and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

The invention claimed is:

1. A cosmetic product comprising:
a housing including an account identifier linking the cosmetic product to a financial account or a financial record, the housing including a first housing member and a second housing member coupled to the first housing member, wherein the first and second housing members are configured to articulate with respect to each other to move between an open state and a closed state, wherein the first housing member includes a first panel, and the second housing member includes a second panel opposite the first panel; and
a cosmetic article enclosed within the housing between the first panel and the second panel, wherein the cosmetic article is removable from the housing when the housing is in the open state;
wherein:
the first panel includes a transparent portion such that a portion of the cosmetic article and a portion the second panel are visible through the first panel when the housing is in the closed state and the cosmetic article is enclosed therein,
the account identifier is printed on the second panel,
the first panel and the second panel have surfaces that contact each other, the surfaces being the same size, and
the first housing member is connected to the second housing member with a hinge.

2. The cosmetic product of claim 1, wherein the account identifier includes a portion that is machine-readable and includes one or more of a bar code, a magnetic strip, a smart chip, or a radio frequency identification (RFID) device.

3. The cosmetic product of claim 1, wherein the housing is rectangular.

4. The cosmetic product of claim 1, wherein the first panel includes first indicia, and the second panel includes second indicia, and wherein the second indicia, the cosmetic article, and the first indicia each have a portion that is visible along a view axis orthogonal to the first panel.

5. The cosmetic product of claim 4, further including a tray configured to removeably secure the cosmetic article within the housing, the tray having a portion that is transparent such that the second indicia are visible therethrough.

6. The cosmetic product of claim 5, wherein the tray is removeably secured within the second housing member via an interference fit.

7. The cosmetic product of claim 4, wherein at least one of the first indicia and the second indicia include an image associated with the cosmetic article.

8. The cosmetic product of claim 7, wherein the cosmetic article includes a material configured to be applied to a human being, and wherein the image is a representation of a physical characteristic of the material.

9. The cosmetic product of claim 1, further including a latch structure releasably connecting the first housing member to the second housing member when the housing is in the closed state.

10. The cosmetic product of claim 1, wherein the cosmetic article comprises a material configured to be applied to human lips.

11. The cosmetic product of claim 10, wherein the material comprises a lip gloss.

12. The cosmetic product of claim 1, in combination with a backer coupled with and configured to support the cosmetic product.

* * * * *